(12) United States Patent
Spraggs et al.

(10) Patent No.: US 8,830,989 B2
(45) Date of Patent: Sep. 9, 2014

(54) AUTOMATIC CONFIGURATION OF PACKET NETWORK SERVICES OVER DENSE WAVELENGTH DIVISION MULTIPLEX COMMUNICATION LINKS USING OPTICAL TRANSPORT NETWORK FRAMES

(75) Inventors: Simon James Trevor Spraggs, Hayling Island (GB); Horia Marius Miclea, Epalinges (CH); George L. Swallow, Boston, MA (US); Ornan Gerstel, Herzliya (IL)

(73) Assignee: Cisco Technology, Inc., San Jose, CA (US)

( * ) Notice: Subject to any disclaimer, the term of this patent is extended or adjusted under 35 U.S.C. 154(b) by 334 days.

(21) Appl. No.: 13/311,615

(22) Filed: Dec. 6, 2011

(65) Prior Publication Data

US 2013/0142511 A1   Jun. 6, 2013

(51) Int. Cl.
*H04L 12/66* (2006.01)

(52) U.S. Cl.
USPC .............................. 370/352; 370/389; 398/49

(58) Field of Classification Search
None
See application file for complete search history.

(56) References Cited

U.S. PATENT DOCUMENTS

| | | | |
|---|---|---|---|
| 6,798,993 B1 | 9/2004 | Adams et al. | |
| 2002/0018269 A1 | 2/2002 | Chaudhuri et al. | |
| 2003/0097472 A1* | 5/2003 | Brissette | 709/245 |
| 2003/0179716 A1 | 9/2003 | Liu | |
| 2007/0280265 A1* | 12/2007 | Gerstel | 370/395.52 |
| 2011/0236013 A1* | 9/2011 | Gazzola et al. | 398/5 |
| 2012/0148236 A1* | 6/2012 | Kumar et al. | 398/34 |
| 2013/0071116 A1* | 3/2013 | Ong | 398/45 |
| 2013/0094862 A1* | 4/2013 | Luo et al. | 398/68 |

OTHER PUBLICATIONS

International Search Report and Written Opinion in counterpart International Application No. PCT/US2012/063775, mailed Feb. 15, 2013.
Gumaste, et al., "Proliferation of the Optical Transport Network: A Use Case Based Study," IEEE Communications Magazine, Sep. 1, 2010, pp. 54-61.
Watanabe, et al., "Robust IP Backbone Network Utilizing WDM Optical Paths," IEICE Transactions on Electronics, vol. E82-C, No. 8, Aug. 1, 1999, pp. 1381-1386.
Srinivasan Seetharaman, IP over DWDM, Last Modified: Nov. 23, 1999, Note: This paper is available on-line at http://www.cis.ohio-state.edu/~jain/cis788-99/ip_dwdm/index.html, (19 pages).

* cited by examiner

*Primary Examiner* — Phirin Sam
(74) *Attorney, Agent, or Firm* — Edell, Shapiro & Finnan, LLC

(57) ABSTRACT

Techniques are provided to automatically configure packet based network services over Dense Wavelength Division Multiplex (DWDM) network communication links. An optical wavelength is detected at an optical interface of a network device configured to send traffic between a packet switched network and an optical network. A message is sent to an optical control plane comprising information configured to request optical configuration information for the optical wavelength. A response to the message is received comprising the optical configuration information and the wavelength is activated at the optical interface using the optical configuration information. A frame is received over the wavelength that is formatted according to an optical protocol. Packet switched network information is extracting from an overhead portion of the frame that is configured to identify network parameters for configuring a packet switched network link and the associated routing. The packet switched network link is configured using the network parameters.

22 Claims, 11 Drawing Sheets

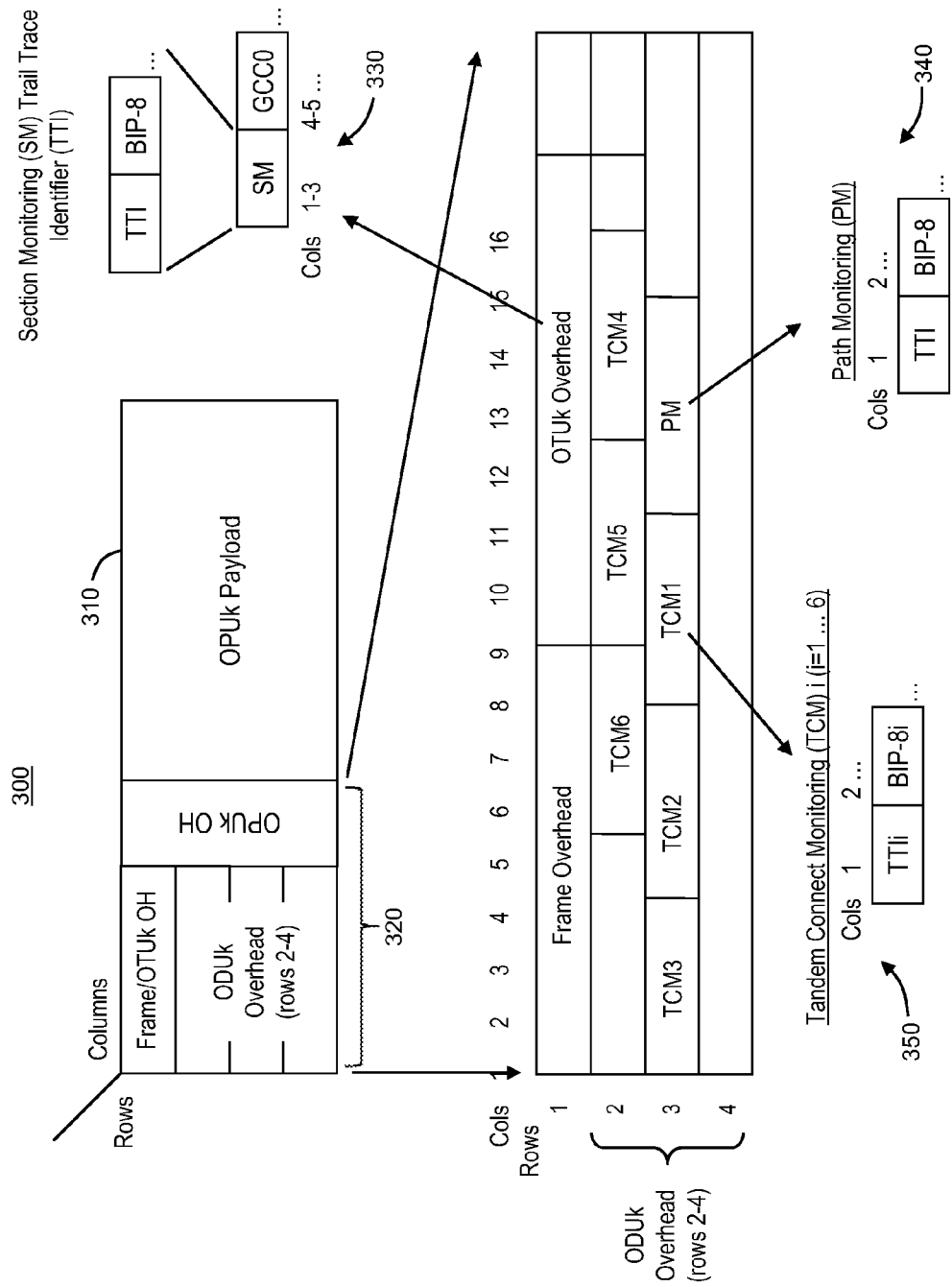

AUTOMATIC CONFIGURATION OF PACKET NETWORK SERVICES OVER DENSE WAVELENGTH DIVISION MULTIPLEX COMMUNICATION LINKS USING OPTICAL TRANSPORT NETWORK FRAMES

TECHNICAL FIELD

The present disclosure relates to Dense Wavelength Division Multiplex (DWDM) network communication links.

BACKGROUND

With the increasing importance of packet services, both from a traffic and economic perspective, the telecommunications industry is looking for ways to improve the end-to-end efficiency of packet switched networks. One of the most promising approaches in the wide area network (WAN) and metro environments is through closer integration between the packet switching layers and the DWDM layers.

Integration of Dense Wavelength Division Multiplex (DWDM) transponders into packet switching equipment, flexible DWDM network components, and the use of a control plane, such as G-MPLS, collectively known as "Agile DWDM") to build optical light paths between packet switches are fairly new concepts. Challenges with this new paradigm include ensuring that the packet switch nodes can detect when a new optical link has been established, determining parameters of the remote packet switch nodes, and placing the correct packet switching configuration on the optical link so the two packet switches can communicate at the packet level. Examples of such packet switching networks include Internet Protocol (IP), IP/Multi-Protocol Label Switching (MPLS), MPLS-Transport Profile with a Generalized MPLS control plane, and Carrier Ethernet networks that use Shortest Path First (SPF) based protocols, e.g., Transparent Interconnect of Lots of Links (TRILL) and Institute of Electrical and Electronics Engineers (IEEE) 802.1aq.

BRIEF DESCRIPTION OF THE DRAWINGS

FIG. 3 is a diagram showing an example of an optical frame transmitted over an optical network that contains information to configure an optical network interface and a packet switched network interface.

DESCRIPTION OF EXAMPLE EMBODIMENTS

Overview

Techniques are provided to automatically configure packet based network services over DWDM network communication links. An optical wavelength is detected at an optical interface of a network device configured to send traffic between a packet switched network and an optical network. A message is sent to an optical control plane comprising information configured to request optical configuration information for the optical wavelength. A response to the message is received comprising the optical configuration information and the wavelength is activated at the optical interface using the optical configuration information. A frame is received over the wavelength that is formatted according to an optical protocol. Packet switched network information is extracted from an overhead portion of the frame that is configured to identify network parameters for configuring a packet switched network link and the packet switched network link is configured using the network parameters.

Techniques are also provided for deactivating Packet-over-DWDM links. The packet switch node detects that the optical wavelength has been deactivated. The optical configuration information is deleted in order to free the optical interface to accommodate a new wavelength. The network parameters for the packet switched network link are removed in order to deactivate the packet switched network link. Accordingly, a new or alternate packet over DWDM link can be established by way of the optical interface.

Example Embodiments

Figure 1A:
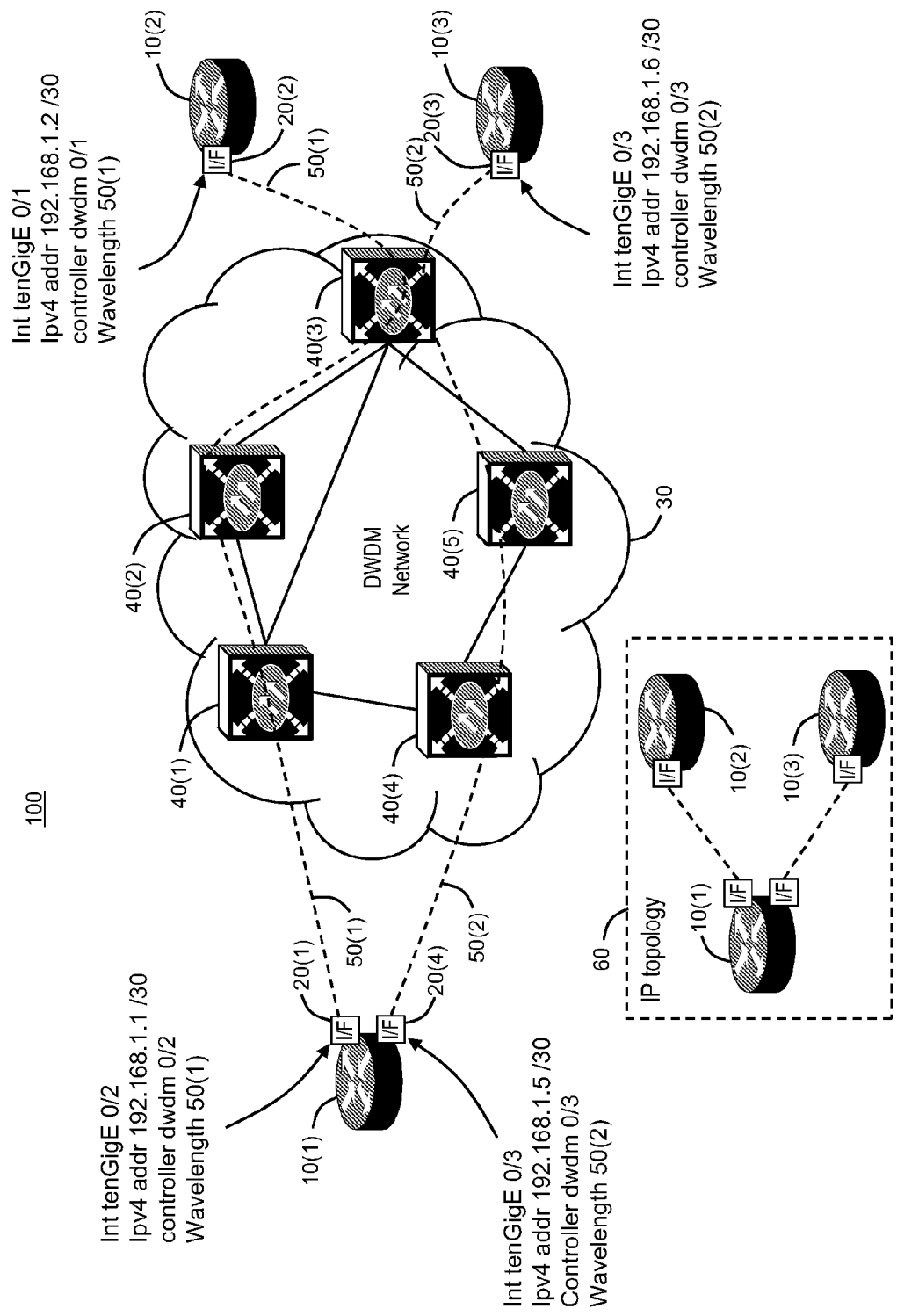
FIG. 1a is a block diagram showing an example of a network comprising packet switched network nodes interconnected through an optical network in which packet switched network components are automatically configured via the optical network.

Referring first to FIG. 1a, a system 100 is shown comprising a packet switched network with packet switches (in this case IP routers) 10(1)-10(3) and an agile DWDM transport network 30 comprising optical cross-connects (OXCs) or reconfigurable optical add/drop multiplexer (ROADMs) 40(1)-40(5). In this example, the agile DWDM network 30 uses Generalized Multi-Protocol Label Switching (GMPLS) as a control plane to provision lambdas (λ) or light paths across its infrastructure for the use by client networks, e.g., IP, IP/MPLS, MPLS-Transport Profile (MPLS-TP), Carrier Ethernet and Digital OTN networks. The DWDM transport network 30 transparently couples the packet switch nodes s 10(1)-10(3) so that they can send traffic to each other as if they were coupled by correspondent point to point connections. This transparency is illustrated by the IP topology 60.

In order to route traffic over the DWDM transport network 30, each of the packet switch node s employs electro-optical interfaces (I/Fs), e.g., integrated optical transponders, as shown at reference numerals 20(1)-20(4). In a network environment where there is a client-server relationship between networks, for example an optical server network and a packet client switched network that uses a GMPLS User Network Interface (UNI) between the client and server layer there are two distinct addressing schemes. The first addressing scheme is associated with the packet network for directing packets while the second addressing scheme is associated with the optical network and is used in the set-up and management of lambda or light paths between the packet switches nodes. These addressing schemes could be the same technology, for example, both the optical and packet switched domains use IP version 4 (IPv4) addressing and routing. Or the addressing and routing schemes used at the client packet switched network could be different than that used in the optical server network. For example, the optical network could use IP version 6 (IPv6) and the client packet switched network could use IPv4. There are several potentially addressing and routing schemes that could be used, examples include Connectionless Network Service (CLNS) with International Telecommunication Union-Telecom (ITU-T) E.164 addressing, IPv4 addressing and routing, IPv6 addressing and routing. From a packet switch node's perspective these optical addresses are associated with the overall address of the packet switch node in the optical domain and the address of each individual optical interface on the packet switch node in the optical domain.

In a packet over DWDM environment the physical links have packet characteristics associated with the packet switched domain, and optical characteristics associated with the optical domain (infrastructure). On a typical packet switch node, the packet configuration is described via a command line interface (CLI) and is used to describe the packet level configuration including addresses, packet and link Maximum Transmission Unit (MTU) sizes, and routing protocols. The packet configuration is applied to the packet interface enabled by the lambda or light path enabled at the optical level. The lambda or light path is an OTN wavelength that traverses the optical network. Today the bandwidth of the wavelength could be any of the following: 2.5 Gbps, 10 Gbps, 40 Gbps or 100 Gbps. In the future as DWDM technology improves higher bandwidth or variable bandwidth wavelengths maybe possible. The scheme outlined herein also applies to these higher bandwidths.

The optical component is the DWDM transponder, e.g., I/Fs 20(1)-20(4), and is typically configured under a separate part of the configuration associated with the transponder. For example, the CLI under a separate DWDM controller command group. The commands associated with the DWDM controller describe the optical parameters used at the optical level to include parameters such as the transponder frequency and other optical level configuration parameters.

There is a one to one relationship between the two domains such that each DWDM transponder (DWDM controller) is associated with exactly one specific packet switched interface. In an environment where the packet switched nodes have integrated transponders and there is a GMPLS UNI between the packet switched domain and the optical domain, the optical GMPLS control plane is responsible for the setup and configuration of the DWDM controllers (transponders) on the packet switched nodes. The control plane detects and configures the optical paths between transponders, e.g., across DWDM transport network 30. The optical GMPLS control plane is not responsible for the set up of the packet based configuration on the interfaces that use light paths.

In many situations, packet set up is not an issue because the packet network operator decides that a particular integrated transponder needs to go to a pre-determined packet switch node. In this situation, the packet network operator configures the packet switch node by first configuring the packet interface with its associated transponder/controller to connect to a specific remote packet switch node, and second, configuring the optical GMPLS control plane commands to set up the transponder to connect to the specific remote packet switch node.

However, there are instances when the above-described configuration approach does not work. For example, rather than specifying a specific transponder/controller to connect to a specific remote packet switch node, the operator would like to configure the optical GMPLS control plane to use any spare or available transponder/controller to connect to the specific remote packet switch node. In this case, the packet network operator has to wait for the optical set up to complete, i.e., transponder/controller and light path set up, and then, based on the selected transponder, install the appropriate packet level configuration on the packet switch node's interface.

In a second example, the network operator has a scheme whereby in normal operations, a particular transponder/controller and the associated packet link is directed to a specific remote packet switch node. However, if the remote packet switch node or transponder in the remote packet switch node fails, then the operator would like to reconfigure the DWDM layer and the packet layer to connect to a different packet switch node. In this instance, the old packet link configuration needs to be removed from the still active packet switch node and a new packet configuration needs to be placed on the packet interface once the new light path becomes active.

In both of the examples described above, a mechanism is desirable that allows the packet level configuration to be attached and removed from the packet interface based on the state of the DWDM controller. For instance, when the transponder/controller is down there is no packet level configuration on the associated packet interface. When the transponder/controller is configured by GMPLS at the optical level and the end-to-end light path becomes active, then the correct packet configuration is installed at the packet interface level on both the local and remote packet switch nodes such that packet level communications can take place between the packet switch nodes.

To achieve this capability, the techniques described herein provide for a solution that allows the packet switch node to detect that the light path is active and determine the remote device so that the correct packet level configuration can be installed on the packet interface. This process occurs at both ends of the optical connection (wavelength). Consider that a new optical connection 50(1) (as shown in FIG. 1) is being brought up from packet switch node 10(1) to packet switch node 10(2) (illustrated using IP routers in this example). Packet switch node 10(1) detects that the light signal is active and that it is attached to packet switch node 10(2). Packet switch node 10(1) downloads and implements the configuration for packet switch node 10(2) on the appropriate interface, e.g., the name and interface, as will be described hereinafter. The reverse process is performed on packet switch node 10(2).

By way of the optical I/Fs 20(1)-20(4) the packet switch nodes with integrated transponders 10(1)-10(3) can "see" or detect OTN frames, e.g., ITU-T standard G.709 OTN frames. The OTN frames serve two purposes. First, information in the frames inform a packet switch node, e.g., packet switch node 10(1), that it is connected optically (via a transponder) to another packet switch node, e.g., packet switch node 10(2). This is achieved through OTN Operations, Administration, and Maintenance (OAM) capabilities (i.e., a management component of the OTN overhead). Second, the packet switch node uses information encapsulated within the header of the G.709 frame, e.g., a Trail Trace Identifier (TTI) field, to determine the name and interface of the remote router. The precise information contained in the TTI field, i.e. the source and the destination access point identifiers (API) of the optical connection, is configured, at initial installation, by the operator, as part of the transponder configuration (under the DWDM controller CLI group). The same set of procedures is performed on the remote router.

To further illustrate, packet switch node 10(1) establishes IP connections with packet switch nodes 10(2) and 10(3) over the agile DWDM transport network 30. The DWDM transport network 30 establishes light paths 50(1) and 50(2), serviced by individual wavelengths (λ). As used herein, a wavelength represents light at a single wavelength or frequency. The control plane of the DWDM transport network 30 establishes the light paths between routers. The optical GMPLS control plane may use a number of additional protocols to establish light path connectivity, e.g., Link Management Protocol (LMP) and/or Open Shortest Path First (OSPF) to determine light path routing. In the example shown in FIG. 1a, light path 50(1) is established between packet switch node 10(1) and packet switch node 10(2) by way of OXCs 40(1), 40(2), and 40(3), respectively. Similarly, light path 50(2) is established between packet switch node 10(1) and packet switch node 10(3) by way of OXCs 40(4), 40(5), and 40(3), respectively.

After the light paths 50(1) and 50(2) are established, the respective DWDM controllers for I/Fs 20(1)-20(4) detect the presence of optical energy, e.g., using a photo diode. Each packet switch node advertises its node name and the optical interface it is using within fields of OTN frames transmitted between I/Fs 20(1)-20(4). This information is shown in FIG. 1a for each of I/Fs 20(1)-20(4). The respective packet switch nodes 10(1)-10(3) extract the remote node name and the remote optical interface from the OTN frames. This information is then used to pull the appropriate packet interface configuration information from a database which can be located locally or remotely. This configuration information is installed on the packet link associated with the optical I/F. Accordingly, the packet links can now establish at the packet level. In FIG. 1A, which uses routers and IPv4 as an example for a packet switched network, note that routers 10(1) and 10(2) are on the same IP subnet and use wavelength 50(1) and that routers 10(1) and 10(3) are on the same IP subnet and use wavelength 50(2). The process described above is referred to herein as a Packet-over-DWDM provisioning process. The Packet-over-DWDM provisioning process is described using specific examples in connection with FIGS. 1a, 1b, 1c, 1d, 2a, 2b, 3, 5a, and 5b; and generally described in connection with FIGS. 4 and 5c.

Figure 1B:
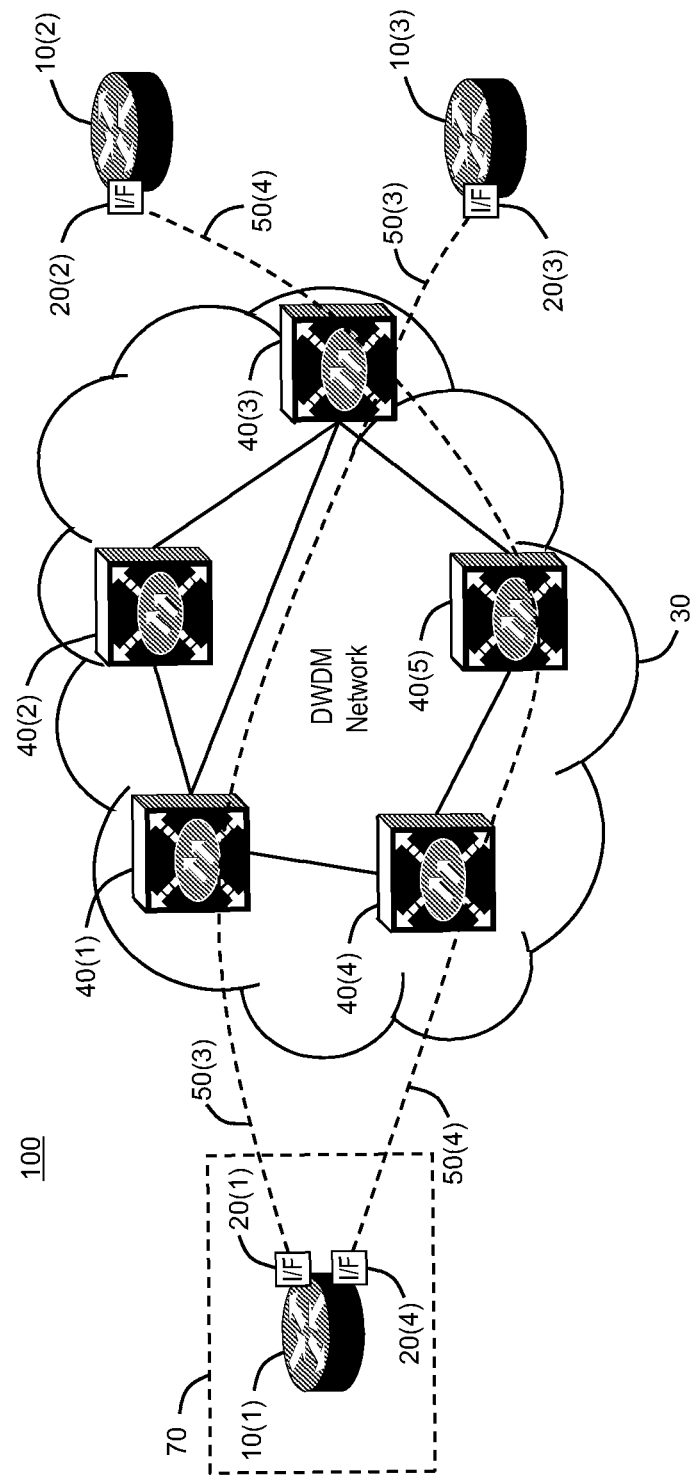
FIG. 1b is a block diagram showing an example of the network from FIG. 1a in which the optical wavelengths coupling the packet switched network nodes are rerouted in response to an optical network event and the packet switched network nodes are automatically reconnected.

Referring now to FIG. 1b, a block diagram is now described that shows an example of the network of FIG. 1a in which the optical wavelengths coupling the packet switched network nodes are rerouted in response to an optical network event and the packet switched network nodes are automatically reconnected. In this example, a network event 70 has impacted packet switch node 10(1), e.g., a component failure or temporary power failure, and packet switch node 10(1) went offline. After packet switch node 10(1) has recovered from the failure, the DWDM transport network 30 has established light paths 50(3) and 50(4) that differ from light paths 50(1) and 50(2) in that the remote endpoints 10(2) and 10(3) have been swapped and that different wavelengths may be employed. The Packet-over-DWDM provisioning process re-establishes the appropriate packet connectivity, by detecting the new light path, retrieving information from the OTN frame about the remote node and using this information to retrieve the correct packet level configuration for the packet based link.

Figure 1C:
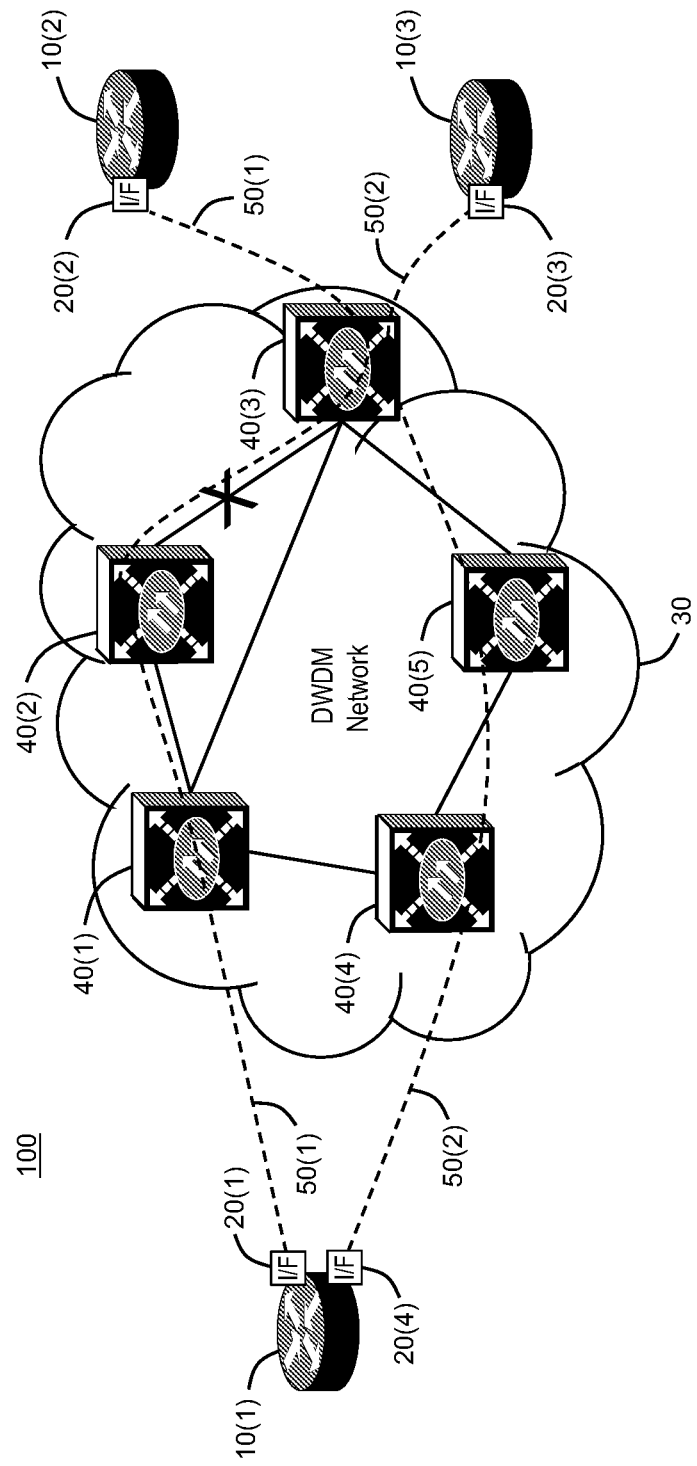
FIG. 1c is a block diagram showing another example of the network from FIG. 1a in which the optical wavelengths coupling the packet switched network nodes are to be rerouted in response to an optical link failure.
Figure 1D:
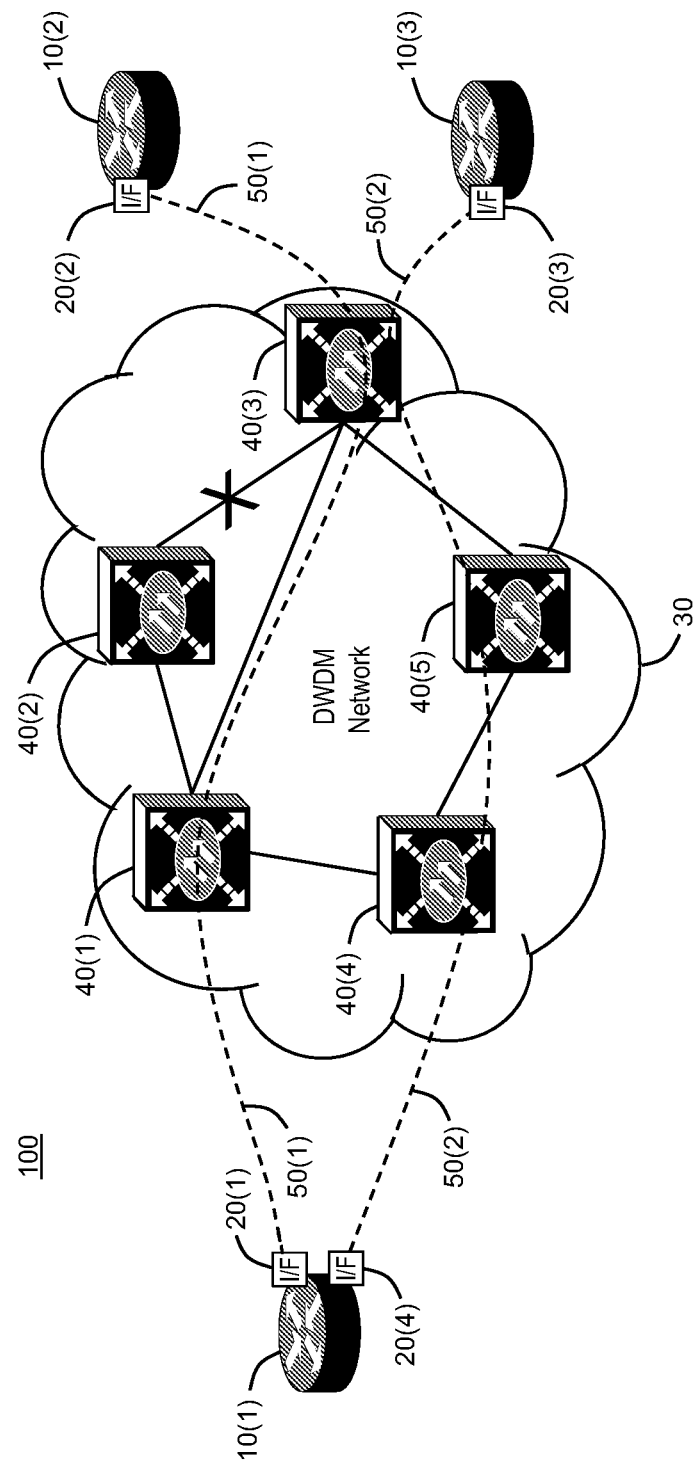
FIG. 1d is a block diagram showing the example of the network from FIG. 1c after the packet switched network nodes are automatically reconnected.

Referring to FIG. 1c, a block diagram is now described showing an example of the network of FIG. 1a in which the optical wavelengths coupling the packet switched network nodes are rerouted in response to an optical network event and the packet switched network is automatically reconnected. In this example, the optical link between packet switch node 40(2) and 40(3) has been severed, e.g., by a commercial digging operation. As shown in FIG. 1d, the control plane of the DWDM transport network 30 reroutes light path 50(1) by way of OXC 40(1) and 40(3). Since the wavelength went down, the connection 50(1) is re-established by the Packet-over-DWDM provisioning process, and may use different I/Fs (optical transponders) and different wavelengths. Accordingly, connection 50(1) is re-established by detecting the light path, retrieving information from the OTN frame about the remote node and using this information to retrieve the correct packet level configuration for the packet link Turning now to FIG. 2a, the Packet-over-DWDM provisioning process is described using an example optical network that couples a core packet switched packet switch network that employs a spare packet switch node 10(6). This example is illustrated using routers and IPv4. The core packet switch network comprises packet switch nodes 10(1)-10(5) which are core packet switch nodes in that they typically provide routing to other packet switch nodes that, in turn, route to one or more packet switched networks. The spare packet switch node 10(6), may act as a spare node for any of the nodes 10(1)-10(5) or for adjacent nodes for which packet connectivity may be provided, e.g., nodes 10(5) and 10(4).

Figure 2A:
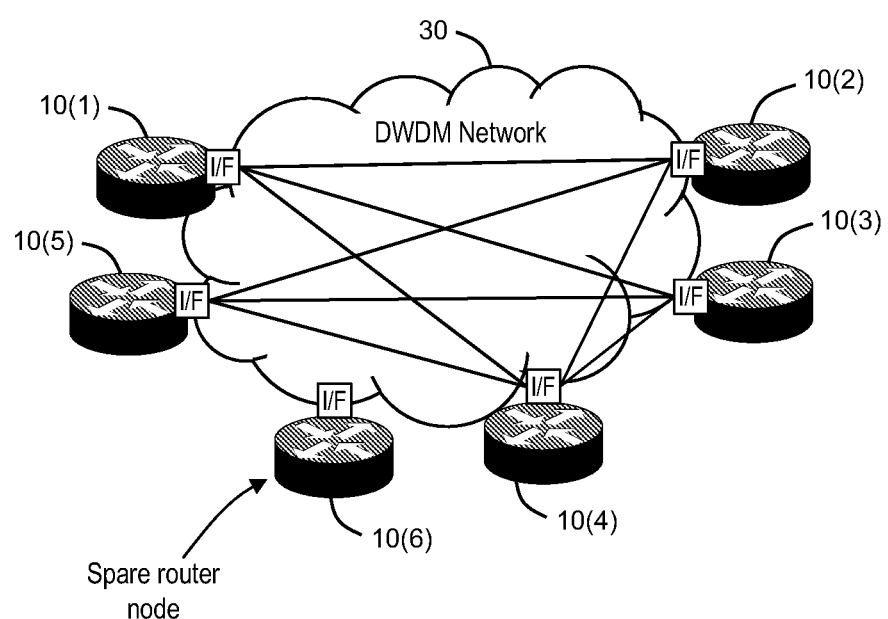
FIG. 2a is a block diagram showing an example of an optical network coupling a core packet switched packet switch node network that employs a spare packet switch node protecting the failure of a core packet switch node.
Figure 2B:
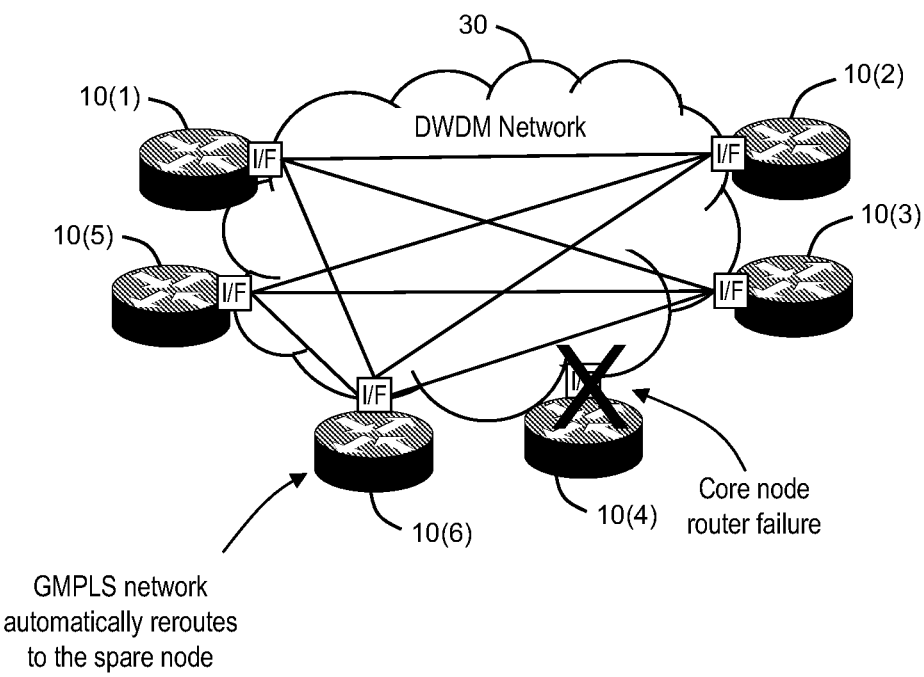
FIG. 2b is the block diagram from FIG. 2a in which the optical network automatically reroutes wavelengths coupling the core packet switch node network to the spare packet switch node in response to a core packet switch node failure.

Referring now to FIG. 2b, the core packet switch network from FIG. 2a is shown when it experiences a core node failure, i.e., packet switch node 10(4) has failed as indicated by the "X" as shown in the figure. The DWDM transport network 30 compensates for the failure using spare packet switch node 10(6) and re-routing the optical connections within network 30 using the techniques described herein. The DWDM transport network 30 has reestablished optical routing within the network 30 to include packet switch node 10(6) and to remove packet switch node 10(5). As shown in the figure, the optical links within network 30 have been reestablished. The optical links may use different wavelengths and different optical interfaces (I/Fs) associated with routers 10(1)-10(4), and the I/Fs associated with packet switch node 10(6). Accordingly, the Packet-over-DWDM provisioning process completes packet level connectivity after the failure of packet switch node 10(5) by detecting the new light paths, retrieving information from the OTN frame about the remote node and using this information to retrieve the correct packet addressing and routing configuration for the new packet level link.

It should be understood that the representations depicted in FIGS. 1a-1c, 2a, and 2b are oversimplifications of the actual network environment. The packet switch nodes and OXCs may be part of a larger network, e.g., a metropolitan area network (MAN) or a WAN. Many components, e.g., additional routers, switches (optical and wireline), combiners, splitters, and optical/electrical conversion components, are omitted for simplicity. The OXCs may be reconfigurable (or not) optical add/drop multiplexers (ROADMs).

Referring to FIG. 3, a diagram showing an example of an optical frame transmitted over an optical network will be described that contains information to configure an optical and a packet switched network interface. An OTN frame 300 comprises a payload section 310 and an overhead section 320 and is labeled with rows and columns typically used to describe OTN frames. The overhead (OH) section is further expanded into four rows and 16 columns as shown in the figure. The overhead section 320 is further labeled with frame overhead, Optical Transport Unit (OTU) k overhead, and Optical Data Unit (ODU) k overhead sections; where k represents a particular bit rate for the payload section 310.

In this example, a Trail Trace Identifier (TTI) is used to transmit and allow for determination of the name and interface of the remote packet switch node. The TTI's may be encapsulated in respective portions of OTU or ODU overheads. The information is used at the receiving packet switch node to identify the remote device and the remote interface. It is then used to pull the appropriate packet level configuration for the remote device from either a locally held or remote database. This configuration information is then implemented on the packet interface associated with the DWDM controller. TTI fields may be encapsulated in a TTI field of the section monitoring (SM) section 330 of the OTUk overhead, a TTI field of the path monitoring (PM) section 340 of the ODUk overhead, or in TTI fields 1-6 of the tandem connection monitoring (TCM) sections 350 of the ODUk overhead. The ODUk PM section has an advantage in that the overhead information is maintained between optical endpoints that span the entire optical network, e.g., DWDM network 30. In contrast, the OTUk and TCM sections, may be rewritten between optical nodes, optical regeneration points, or tandem connect layers, the details of which are not germane to the techniques described herein. The additional fields shown at 330, 340, and 350 provide a point of reference for the reader, e.g., bit interleave parity (BIP) and GCC0 fields.

Figure 4:
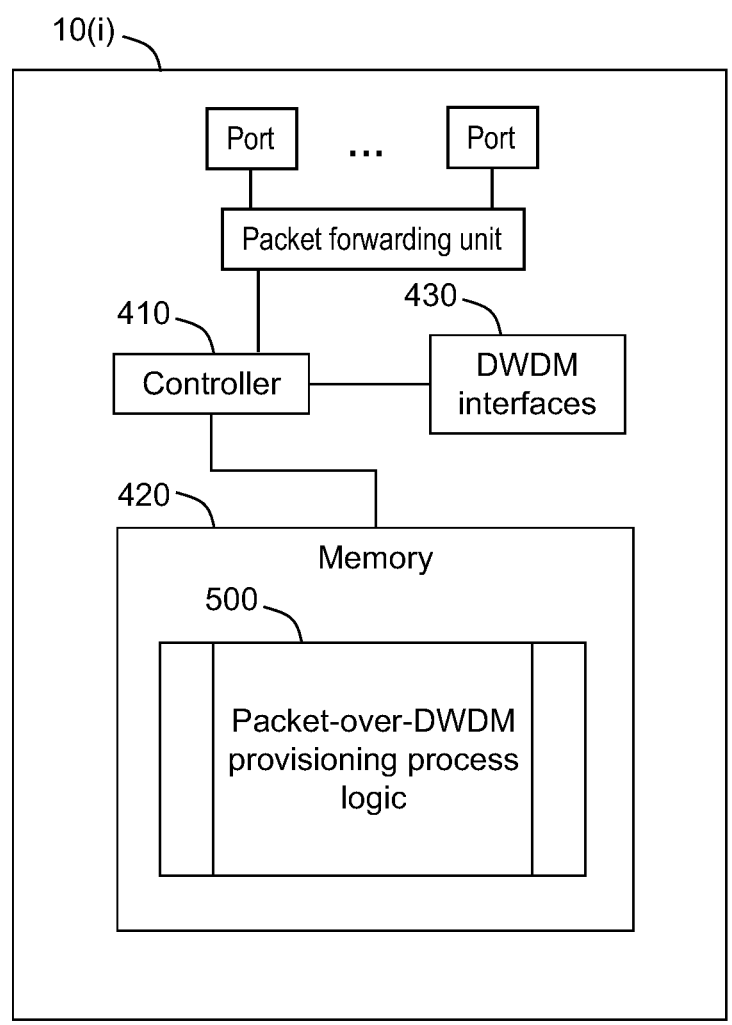
FIG. 4 is a block diagram showing an example of a network device configured to route packet switched network traffic over an optical network.

Turning now to FIG. 4, an example block diagram is shown of a packet switch node configured to perform the Packet-over-DWDM provisioning process logic 500 and other functions described herein. The packet switch node shown in FIG. 4 is representative of any of the packet switch nodes 10(1)-10(6) shown in FIGS. 1a-1d and 2a-2b. The packet switch node, shown generically by reference numeral 10(i), comprises a processor or controller 410, memory 420 a DWDM interface unit (transponder) 430, a plurality of ports 440(1)-4402(M) and a packet forwarding unit 450. The ports 440(1)-4402(M) are ingress and egress ports used to receive incoming packets and to output outgoing packets for a packet switched network. The packet forwarding unit 450 is, for example, one or more application specific integrated circuits (ASICs) that includes buffers, queues, and other control logic for performing packet forwarding operations and for performing hashing operations on packets to determine to which of the ports (among ports 440(1)-4402(M)) packets are sending and receiving packets for the packet switch node 10(i).

The controller 410 is, for example, a microcontroller or microprocessor that is configured to perform higher level controls of the packet switch node and execute software instructions stored in memory 420. To this end, the memory 420 stores software instructions that, when executed by the controller 410, cause the controller 410 to perform a variety of operations including operations described herein.

The memory 420 stores instructions for Packet-over-DWDM provisioning process logic 500. The memory 420 may comprise read only memory (ROM), random access memory (RAM), magnetic disk storage media devices, optical storage media devices, flash memory devices, electrical, optical, or other physical/tangible memory storage devices. The Packet-over-DWDM provisioning process logic 500 comprises software instructions that, when executed, cause the controller 410 to configure DWDM interface(s) 430 and packet interfaces according to the techniques described herein. Thus, in general, the memory 420 may comprise one or more tangible (non-transitory) computer readable storage media (e.g., a memory device) encoded with software comprising computer executable instructions and when the software is executed (by the controller 410) it is operable to perform the operations described herein in connection with process logic 500.

Figure 5A:
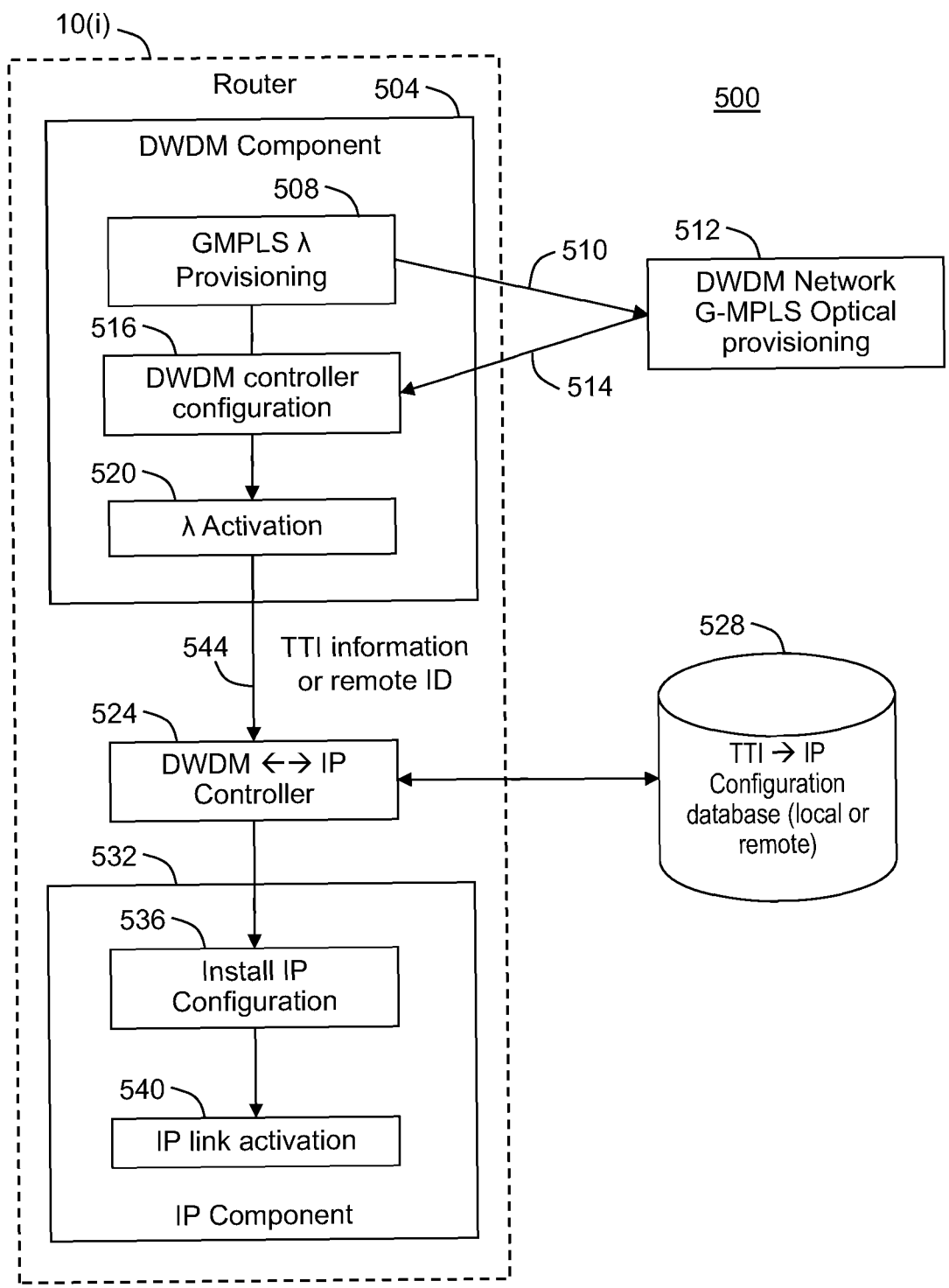
FIG. 5a depicts a flow chart for a specific example of a process to provision the packet link (in the example Internet Protocol (IP) network link) using information obtained from an optical transport network (OTN) frame.
Figure 5B:
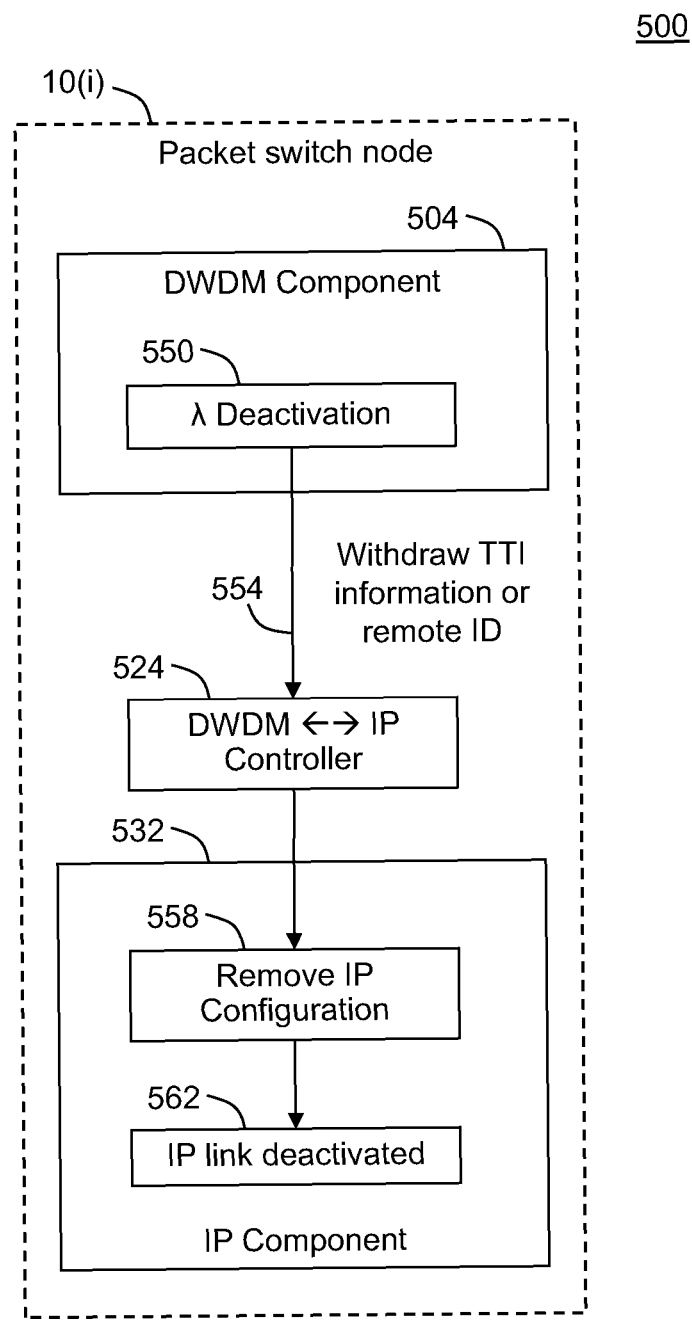
FIG. 5b depicts a flow chart for a specific example of a process for decommissioning packet link (in this example an IP network link).

FIGS. 5a and 5b depict a flow chart for a specific example of Packet-over-DWDM provisioning process logic 500 that commissions and decommissions packet/optical network links for router/transponder combinations. As in FIG. 4, the packet switch node 10(i) shown in FIGS. 5a and 5b is representative of any of the packet switch nodes 10(1)-10(6) shown in FIGS. 1 and 2, and is illustrated as a dashed line due to the process illustration shown in FIGS. 5a and 5b, as opposed to the actual hardware components shown in FIGS. 1a-1c, 2a, 2b, and 4.

The packet switch node 10(i) has a logical DWDM component 504 and packet component 532. For activation of wavelengths and packet links, the information contained within the TTI fields in the OTN frame overhead is predefined on each DWDM controller with a unique identifier. For example, the TTI field for a first packet switch node could be "RTR1:Int1.1" to indicate the packet switch node name is RTR1 and the DWDM interface is 1.1. Similarly, the TTI field for a second packet switch node could be "RTR2:Int2.1" to indicate the packet switch node name of RTR2 and the DWDM interface is 2.1. Initially, all DWDM controllers and packet level links may be considered to be inactive.

At 508, a light path or wavelength (λ) is needed between packet switch node 10(i) and another packet switch node. At 510, the packet switch node 10(i) sends a message, e.g., a UNI message, to the GMPLS control plane comprising information configured to request wavelength and a DWDM controller configuration, but does not specify any particular DWDM controller/transponder. At 512, the control plane of the DWDM transport network provisions a wavelength to packet switch node 10(i), and at 514, sends a message to the packet switch node 10(i) comprising information indicating which DWDM interface to use. At 520, the wavelength is activated and becomes operational at the OTN layer and the two packet switch nodes endpoints are now exchanging TTIs.

The presence of the TTIs indicates that the optical link is active and contains the name of the remote packet switch node as well as the DWDM controller ID as described above. At this stage the packet switch nodes themselves cannot communicate at the packet level because they do not have valid packet configurations on the respective packet level interfaces. At 544, packet switch node 10(i) receives an OTN frame. At 524, the DWDM controller provides the TTI field information to the packet level controller. The packet level controller is now aware that it is connected to a remote packet switch node and the remote packet switch node's I/F. At 528, packet switch node 10(i) refers to either a local or remote database and pulls the packet level interface configuration for the remote packet switch node. At 536, the packet level controller installs the packet level configuration on the packet level interface associated with the newly activated DWDM transponder. At 540, packet switch node 10(i) and the remote packet switch node begin packet level communications.

In some instances the process described in connection with FIG. 5a will be the final configuration and the transponders will not be re-configured. However, given the dynamic capabilities offered by a GMPLS control plane at the optical level there will be scenarios where benefits may be achieved by changing the light path configurations based on traffic requirements.

Referring to FIG. 5b, the packet switch node 10(i) from FIG. 5a is shown with a process for deactivating a connection in order to change the light path configuration. At 550, the wavelength is deactivated. As a consequence, the packet level connection between packet switch node 10(i) and the packet switch node fails. Logic within the optical or packet domain indicates that if this link fails then a link from packet switch node 10(i) should now connect to a second remote packet switch node. Packet switch node 10(i) detects that the light path is no longer operational (based on OTN OAM) and TTI messages are no longer received from the remote packet switch node. At 554, the TTI information is withdrawn from the packet level controller. At 558, the packet level controller removes the packet configuration from the packet interface associated with the remote packet switch node. At 562, the packet link no longer has any packet level configuration.

The optical domain operator (or optical configuration automation) sends a GMPLS request from packet switch node 10(i) to the optical domain requesting a light path to the second remote packet switch node using the same process as described in connection with FIG. 5a. The process continues as described above and a packet level connection is established between packet switch node 10(i) and the second remote packet switch node.

Figure 5C:
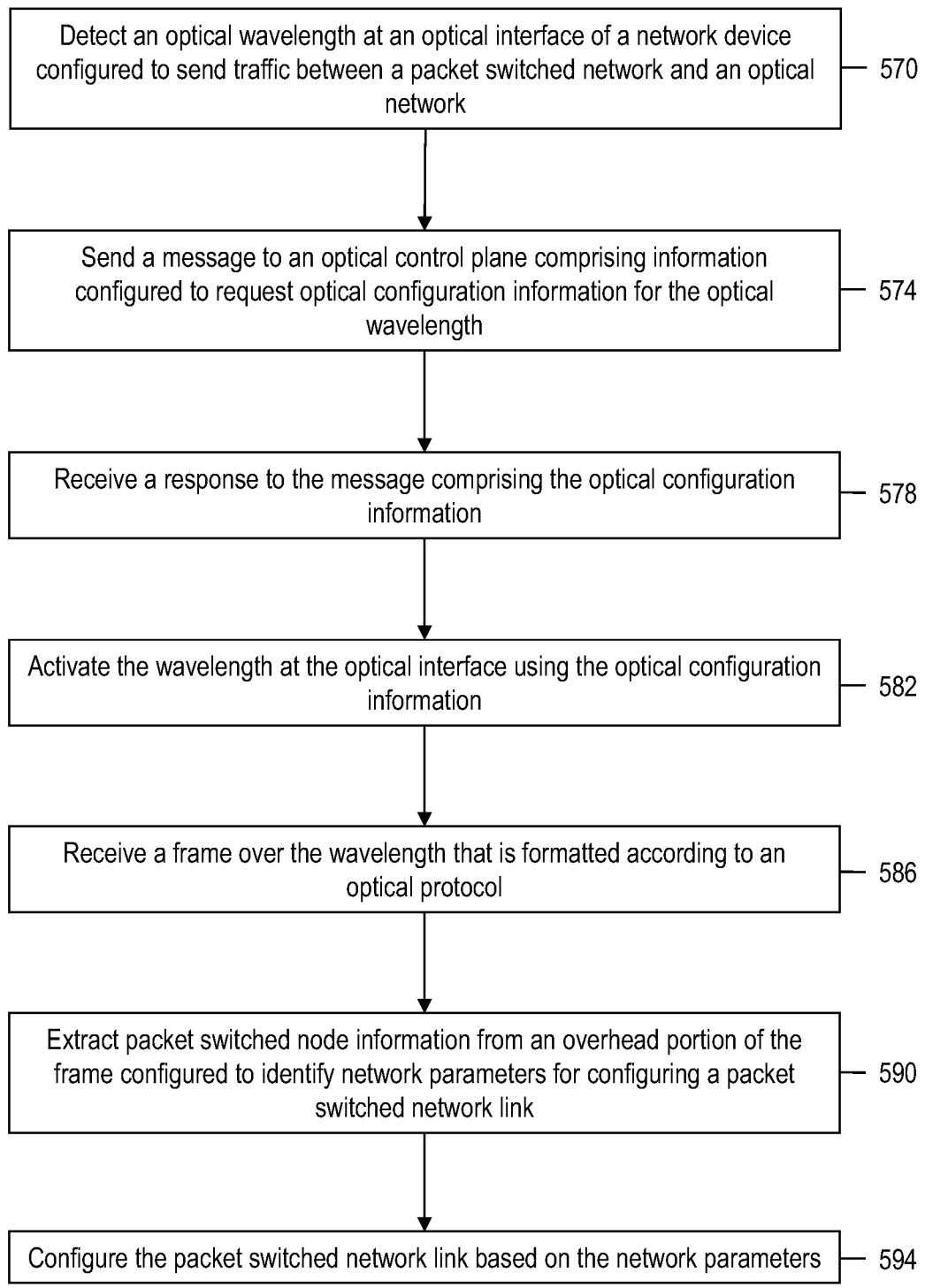
FIG. 5c depicts a flow chart for a general example of a process for provisioning a packet switched network link using information obtained from an optical frame.

Reference is now made to FIG. 5c. FIG. 5c shows a flow chart that generally depicts operations of the Packet-over-DWDM provisioning process logic 500. At 570, an optical wavelength is detected at an optical interface of a network device, e.g., packet switch node 10(i), configured to send traffic between packet switches interconnected over an optical network, e.g., DWDM transport network 30 (FIG. 1a). At 574, a message is sent to an optical control plane, the message comprising information configured to request optical configuration information for the optical wavelength. At 578, a response to the message is received, the response comprising the optical configuration information, and at 582, the wavelength is activated at the optical interface using the optical configuration information.

At 586, a frame is received over the wavelength, the frame being formatted according to an optical protocol, e.g., an OTN frame. At 590, information about the remote packet switched node is extracted from an overhead portion of the OTN frame, where the packet switched network information identifies network parameters for configuring a packet switched network link. At 594, the packet switched network link is configured using the network parameters.

The techniques further include performing a database lookup using the packet switched network information in a database that stores the network parameters. The network parameters are received in response to the database lookup. The packet switched network may be an IP (v4 or v6), IP/MPLS, MPLS-TP network with a GMPLS control plane, or a Carrier Ethernet that uses an SPF based routing protocol, e.g., TRILL and 802.1aq. The packet switched network link may be IP, MPLS or Ethernet network link or a combination. The packet switched network information may be extracted from an OTU overhead portion or an ODU overhead portion of the OTN frame. The packet switched network information may be extracted from one or more of a Section Monitoring field of the OTU overhead, a Path Monitoring field of the ODU overhead, and one or more Tandem Connection Monitoring fields of the ODU overhead.

The packet switched network information may be contained in a TTI field of one or more of the Section Monitoring field, the Path Monitoring field, and the one or more Tandem Connection Monitoring fields. The TTI field may comprise a database lookup parameter and a database lookup is performed to retrieve the packet switched network information. The Trail Trace Identifier field may comprise the network parameters themselves and may be in the form of a text string or one or more numeric identifiers.

Techniques are provided herein for deactivating packet over DWDM links. The packet switch node detects that the optical wavelength has been deactivated. The optical configuration information is deleted in order to free the optical interface to accommodate a new wavelength. The network parameters for the packet switched network link are removed in order to deactivate the packet switched network link. Accordingly, a new packet over DWDM link can be established.

The techniques described herein provide several advantages. For example, packet-to-optical domain connections no longer have to be configured manually, the optical control plane can reroute wavelengths as needed for operational efficiency, and wavelengths can be automatically rerouted in response to network events, e.g., hardware or power failures.

The above description is intended by way of example only.

What is claimed is:

1. A method comprising:
    detecting an optical wavelength at an optical interface of a network device configured to send traffic between a packet switched network and an optical network;
    sending to an optical control plane a message comprising information configured to request optical configuration information for the optical wavelength;
    receiving a response to the message, the response comprising the optical configuration information;
    activating the wavelength at the optical interface using the optical configuration information;
    receiving over the wavelength a frame that is formatted according to an optical protocol;
    extracting from an overhead portion of the frame packet switched network information that identify network parameters for configuring a packet switched network link and associated routing;
    detecting that the optical wavelength has been deactivated;
    deleting the optical configuration information in order to free the optical interface to accommodate a new wavelength; and
    removing the network parameters for the packet switched network link in order to deactivate the packet switched network link.

2. The method of claim 1, further comprising:
    performing a database lookup using the packet switched network information in a local or remote database that stores the network parameters; and
    receiving the network parameters in response to the database lookup.

3. The method of claim 1, further comprising configuring the packet switched network link based on the network parameters.

4. The method of claim 1, wherein the packet switched network is an Internet Protocol network, wherein configuring comprises configuring an Internet Protocol network link and associated packet level attributes.

5. The method of claim 1, wherein the packet switched network is a Multi Protocol Label Switching network, wherein configuring comprises configuring an Internet Protocol/Multi Protocol Label Switching network link and associated packet level attributes.

6. The method of claim 1, wherein the packet switched network is a Multi Protocol Label Switching—Transport Profile network, wherein configuring comprises configuring a Multi Protocol Label Switching—Transport Profile network link and associated packet level attributes.

7. The method of claim 1, wherein the packet switched network is a Carrier Ethernet network using a Shortest Path First based routing algorithm, wherein the method further comprises configuring an Ethernet network link and associated packet level attributes comprising one or more of Transparent Interconnect of Lots of Links and Institute of Electrical and Electronics Engineers 802.1 aq network attributes.

8. The method of claim 1, wherein the frame comprises an Optical Network Transport frame, and wherein extracting comprises extracting the packet switched network information from an Optical Channel Transport Unit overhead portion or an Optical Channel Data Unit overhead portion of the Optical Network Transport frame.

9. The method of claim 8, wherein extracting comprises extracting the packet switched network information from one or more of a Section Monitoring field of the Optical Channel Transport Unit overhead, a Path Monitoring field of the Optical Channel Data Unit overhead, and one or more Tandem Connection Monitoring fields of the Optical Channel Data Unit overhead.

10. The method of claim 9, wherein extracting comprises extracting the packet switched network information from a Trail Trace Identifier field of one or more of the Section Monitoring field, the Path Monitoring field, and the one or more Tandem Connection Monitoring fields.

11. The method of claim 10, wherein the Trail Trace Identifier field comprises the packet switched network information configured as a database lookup parameter, and further comprising:
   performing a database lookup using the packet switched network information;
   receiving the network parameters in response to the database lookup; and
   configuring the packet switched network link and associated packet switched components using the network parameters.

12. The method of claim 10, wherein the Trail Trace Identifier field includes the network parameters, and further comprising configuring the packet switched network link using the network parameters.

13. An apparatus comprising:
   an optical interface configured to:
      detect the presence or absence of an optical wavelength;
      transmit and receive optical frames and optical control plane information;
      in response to detecting the presence of a wavelength,
         send a message to an optical control plane, the message comprising information configured to request optical configuration information for the optical wavelength;
         receive a response to the message, the response comprising the optical configuration information;
         activate the wavelength at the optical interface using the optical configuration information; and
         receive over the wavelength a frame that is formatted according to an optical protocol;
         detect that the optical wavelength has been deactivated;
         delete the optical configuration information in order to free the optical interface to accommodate a new wavelength; and
   a controller configured to:
      extract from an overhead portion of the frame packet switched network information that identifies network parameters for configuring a packet switched network link; and
      configure the packet switched network link and associated routing based on the network parameters, and
      remove the network parameters for the packet switched network link in order to deactivate the packet switched network link.

14. The apparatus of claim 13, wherein the controller is further configured to:
   perform a database lookup using the packet switched network information in a database that stores the network parameters; and
   receive the network parameters in response to the database lookup.

15. The apparatus of claim 13, wherein the frame comprises an Optical Network Transport frame and the controller is configured to extract the packet switched network information from an Optical Channel Transport Unit overhead portion or an Optical Channel Data Unit overhead portion of the Optical Network Transport frame.

16. The apparatus of claim 15, wherein the controller is configured to extract the packet switched network information from one or more of a Section Monitoring field of the Optical Channel Transport Unit overhead, a Path Monitoring field of the Optical Channel Data Unit overhead, and one or more Tandem Connection Monitoring fields of the Optical Channel Data Unit overhead.

17. The apparatus of claim 16, wherein the controller is configured to extract the packet switched network information from a Trail Trace Identifier field of one or more of the Section Monitoring field, the Path Monitoring field, and the one or more Tandem Connection Monitoring fields.

18. One or more non-transitory computer readable storage media encoded with software comprising computer executable instructions and when the software is executed operable to:
   detect presence of an optical wavelength at an optical interface of a network device configured to route traffic between a packet switched network and an optical network;
   send to an optical control plane a message comprising information configured to request optical configuration information for the optical wavelength;
   receive a response to the message, the response comprising the optical configuration information;
   activate the wavelength at the optical interface using the optical configuration information;
   receive over the wavelength a frame that is formatted according to an optical protocol;
   extract from an overhead portion of the frame packet switched network information that identifies network parameters for configuring a packet switched network link;
   configure the packet switched network link and associated routing based on the network parameters;
   detect that the optical wavelength has been deactivated;
   delete the optical configuration information in order to free the optical interface to accommodate a new wavelength; and
   remove the network parameters for the packet switched network link in order to deactivate the packet switched network link.

19. The computer readable storage media of claim 18, further comprising instructions operable to:
   perform a database lookup using the packet switched network information in a database that stores the network parameters; and
   receive the network parameters in response to the database lookup.

20. The computer readable storage of claim 18, wherein the frame comprises an Optical Network Transport frame, and wherein the instructions operable to extract comprise instructions operable to extract the packet switched network information from an Optical Channel Transport Unit overhead portion or an Optical Channel Data Unit overhead portion of the Optical Network Transport frame.

21. The computer readable storage of claim 18, wherein the instructions operable to extract comprise instructions operable to extract the packet switched network information from one or more of a Section Monitoring field of the Optical Channel Transport Unit overhead, a Path Monitoring field of the Optical Channel Data Unit overhead, and one or more Tandem Connection Monitoring fields of the Optical Channel Data Unit overhead.

22. The computer readable storage of claim 21, wherein the instructions operable to extract comprise instructions operable to extract the packet switched network information from a Trail Trace Identifier field of one or more of the Section Monitoring field, the Path Monitoring field, and the one or more Tandem Connection Monitoring fields.

\* \* \* \* \*